(12) United States Patent
Levy et al.

(10) Patent No.: US 6,204,496 B1
(45) Date of Patent: Mar. 20, 2001

(54) FOCAL PLANE READOUT UNIT CELL INDUCED PULSE DIVERSION CIRCUIT AND METHOD

(75) Inventors: Miguel E. Levy, Camarillo; David S. Madajian, Santa Barbara, both of CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/163,930

(22) Filed: Sep. 29, 1998

(51) Int. Cl.[7] ................................................ H01J 40/14
(52) U.S. Cl. ................................... 250/214 R; 250/208.1
(58) Field of Search ........................... 250/214 R, 208.1, 250/214 LS, 216; 348/300, 307, 308; 364/574, 575, 554

(56) References Cited

U.S. PATENT DOCUMENTS 5,119,321    6/1992  Burton, Jr. et al. ................. 364/574
5,436,451 *  7/1995  Silver et al. ....................... 250/336.1

* cited by examiner

*Primary Examiner*—Que T. Le
(74) *Attorney, Agent, or Firm*—William C. Schubert; Glenn H. Lenzen, Jr.

(57) ABSTRACT

An induced pulse diversion circuit (12) senses the presence of pulses in an input signal, particularly β and γ pulses induced into the photocurrent input to a focal plane readout unit cell (50), and diverts them from a main signal path (14) to a diversion path (16). A pair of gate devices (18,20) control access to the signal and diversion paths, respectively. An inverting amplifier (30) receives the incoming photocurrent and, upon receipt of an induced pulse, produces an output that turns on the diversion path's gate device (20) and turns off the signal path's gate device (18). The invention reduces the occurrence of "toggling" by limiting the negative-going excursions of the inverting amplifier made in response to an induced pulse, so that the amplifier is prevented from being driven into saturation. The relatively few components needed to implement the invention fit within the area allotted to an integrated unit cell, arrays of which are integrated together to form a focal plane array.

37 Claims, 6 Drawing Sheets

FOCAL PLANE READOUT UNIT CELL INDUCED PULSE DIVERSION CIRCUIT AND METHOD

This invention was made with Government support under contract No. DASG60-90-C-0128 awarded by the Department of the Army. The Government has certain rights in this invention.

BACKGROUND OF THE INVENTION

1. Field of the Invention

This invention relates to focal plane readout unit cells, and particularly to techniques for sensing induced pulses and diverting them from a unit cell's signal path.

2. Description of the Related Art

A focal plane array is made from an array of photodetectors that are coupled to respective "readout unit cells". The unit cells integrate the photocurrent produced by their respective photodetector over a specific integration period, and the integrated currents are multiplexed and amplified to produce a single video output.

One problem faced by focal plane arrays, particularly infrared arrays operating in the presence of nuclear radiation, for example, is that of ionizing radiation which is absorbed by the photodetectors. The radiation, which can include beta ($\beta$) and gamma ($\gamma$) rays, deposits a charge packet on the photodetector's p-n junction capacitance. The charge packet causes a voltage step to appear across the junction, inducing extremely short pulses or spikes in the photocurrent output. In a typical application, as many as 4–5 pulses can be induced in the course of a typical integration period (~8 ms), which introduce undesirable noise into the unit cell's signal path.

Efforts have been made to reduce or eliminate the negative impact of such induced pulses. One method is referred to as "sub-frame averaging", and is described in U.S. Pat. No. 5,119,321 to Burton, Jr. et al., for example. Many frames of video data are taken within the integration period, and signal processing is used to eliminate the frames that are corrupted by noise pulses. However, detecting corruption due to noise pulses is difficult for the small but non-negligible pulses typically induced by radiation absorption. Also, the elimination of corrupted video data makes it difficult or impossible to preserve the systems' radiometric calibration. Nor can the circuitry required to perform sub-frame averaging be practically realized within the area of a unit cell, arrays of which are typically integrated together on a common substrate.

A need exists for a circuit or method that reduces or eliminates the negative impact of pulses induced in a photodetector's photocurrent output, which can be realized within the area allotted a unit cell.

SUMMARY OF THE INVENTION

An induced pulse diversion circuit is presented which senses induced pulses in an input signal and diverts them from a main signal path. The circuit is particularly well-suited for removing $\beta$ and $\gamma$ pulses induced into the photocurrent input to a focal plane readout unit cell.

The pulse diversion circuit includes a diversion control circuit which, in a typical application, receives an input signal that includes a constant or slowly varying photocurrent. The diversion control circuit monitors the input signal for the presence of induced pulses. When no pulses are sensed, nearly all of the input is directed to the signal path, where it is integrated and processed. However, upon sensing a pulse, the diversion control circuit diverts the input signal to the diversion path. The photocurrent input is directed back onto the signal path once the induced pulse has been removed from the signal path.

In a preferred embodiment, a pair of gate devices, preferably MOSFETS, control access to the signal and diversion paths, respectively. The diversion control circuit includes a pass transistor which feeds the input signal to both gate devices. The diversion control circuit also includes an inverting amplifier which is driven by the input signal, with the inverted output connected to the control inputs of both the pass transistor and the MOSFET gate device controlling access to the diversion path.

The inverting amplifier is arranged such that a positive pulse produces a negative-going output which, when sufficiently negative, turns on the diversion path's gate device and turns off the signal path's gate device. The pulse is thus directed onto the diversion path. After the pulse has been diverted, the inverting amplifier's output rises, terminating access to the diversion path and restoring access to the signal path.

The inverting amplifier's negative-going output is also coupled through the pass transistor back to the amplifier's input, and the resulting positive output voltage can turn off the pass transistor. If the amplifier is slow to recover, the turn-off time becomes unacceptably long and "toggling" can occur, i.e., entire frames of video data are lost, causing a displayed image to toggle on and off. The invention controls the occurrence of toggling by limiting the negative-going transitions of the inverting amplifier so that it is prevented from being driven into saturation.

The relatively few components needed to implement the invention fit within the area allotted to an integrated unit cell. Arrays of such cells are integrated together to form a focal plane array.

Further features and advantages of the invention will be apparent to those skilled in the art from the following detailed description, taken together with the accompanying drawings.

DETAILED DESCRIPTION OF THE INVENTION

Figure 1:
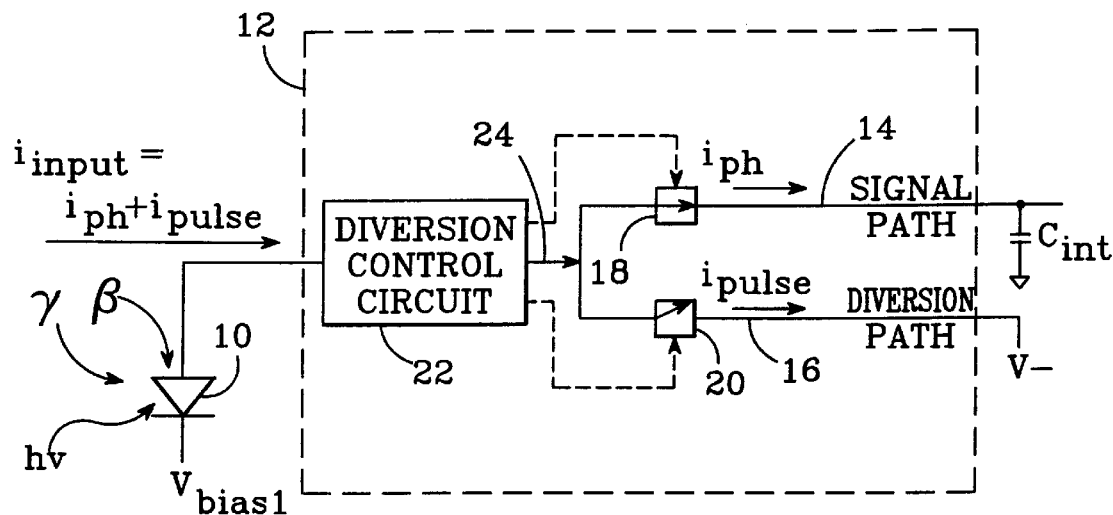
FIG. 1 is a conceptual block diagram of the present invention.

The basic principles of the invention are illustrated in FIG. 1. A photodetector 10 produces a photocurrent output $i_{ph}$ in accordance with the number of photons impinging on it to which it is sensitive. Other stimuli can induce pulses into the photodetector's output which are superimposed on photocurrent $i_{ph}$; this component of the output is labeled $i_{pulse}$. The combination of these components, i.e., $i_{ph}+i_{pulse}$, forms a signal $i_{input}$ which is presented to induced pulse diversion circuitry 12 discussed below.

Pulses can be induced into $i_{input}$ in several ways. When the photodetector is employed as part of a focal plane array used in the presence of nuclear radiation, for example, it can be subjected to ionizing radiation in the form of β and γ rays. The rays can be absorbed by the photodetector, which causes the nearly instantaneous deposition of a charge packet on the detector's junction capacitance. The polarity of the resulting voltage step tends to forward-bias the detector, and a pulse or spike appears in its output. These pulses contribute undesirable noise to signal of interest $i_{ph}$. Pulses might also be induced into the photodetector's output by a laser designator or by laser rangefinder radiation.

Regardless of the source of the induced pulses, the invention acts to separate the pulse component $i_{pulse}$ from the relatively slowly varying photocurrent signal $i_{ph}$. The induced pulse diversion circuitry 12 includes a "signal path" 14 for conveying the signal of interest $i_{ph}$ to downstream processing circuitry, and a "diversion path" 16, to which pulses separated from $i_{input}$ are directed and where they can be disposed of or preserved as needed. The signal path 14 leads to the unit cell's integrating capacitor $C_{int}$ and is eventually multiplexed with the signal paths from other unit cells to produce a video signal. The diversion path 16 is connected to ground or a negative voltage if the pulses are to be disposed of, or can be connected to some type of storage medium if the pulses are to be preserved.

Access to the signal and diversion paths is controlled with gate devices 18 and 20, respectively, which are opened and closed with a diversion control circuit 22. Diversion control circuit 22 preferably performs two primary functions: it serves as an interface circuit by presenting a low impedance to $i_{input}$ and producing a high impedance output 24 which is fed to both gate devices 18 and 20. In addition, circuit 22 is arranged to sense the presence of pulses in $i_{input}$, and to act upon their detection. When no pulses are present, circuit 22 keeps gate device 20 closed and 18 open, so that $i_{input}$, consisting almost entirely of signal of interest $i_{ph}$, is directed onto signal path 14. However, when a pulse is sensed, circuit 22 opens gate device 20 and closes device 18, so that the pulse is directed onto the diversion path 16. Ideally, gate device 20 is kept open only long enough to divert the pulse from the signal path. In this way, pulses induced into the incoming photocurrent, and the resultant noise that would otherwise be present, are removed from the signal path. In practice, the gate devices are not completely closed or opened; operation of pulse diversion circuit 12 requires that a small percentage of $i_{input}$ be directed onto the "closed" path, and $i_{input}$ must exceed a particular threshold to be passed onto signal path 14.

Note that, although FIG. 1 depicts a p-on-n photodetector as the signal source, the invention can be configured to work with either polarity of detector or, more generally, any signal source in which short pulses are superimposed on a relatively slowly varying signal. For a p-on-n detector, the constant or slowly varying signal and the short pulses are both positive. For an n-on-p detector, the constant or slowly varying signal and the short pulses are both negative. In this latter case, the polarity of the devices through which the signal and pulses are conducted is the opposite of that used for the equivalent devices of the p-on-n detector; i.e., PMOS devices are replaced with NMOS devices.

Figure 2:
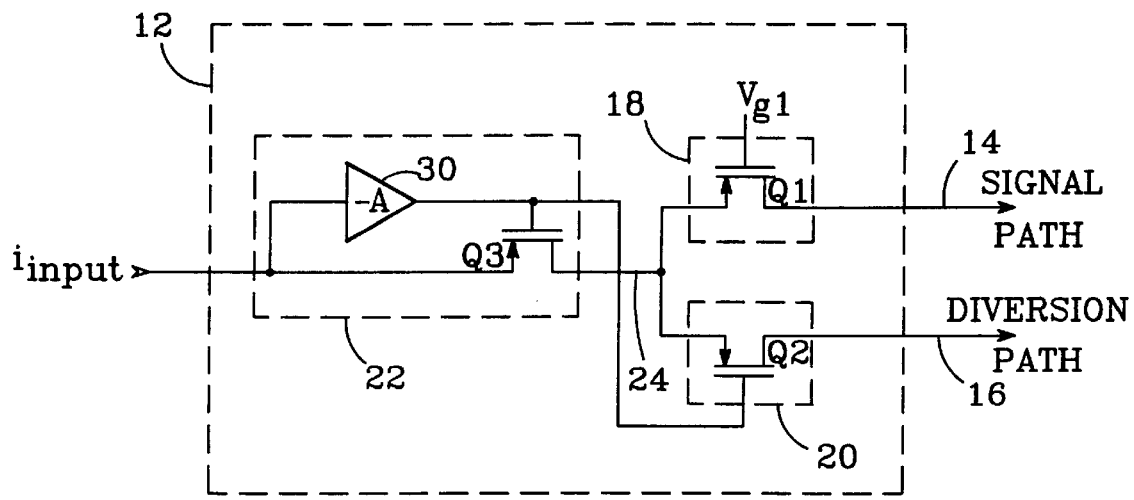
FIG. 2 is a schematic diagram of an embodiment of the present invention.

A schematic diagram of an embodiment of the invention is shown in FIG. 2. Gate devices 18 and 20 are implemented with a PMOS FET Q1 and a PMOS FET Q2, respectively, which are turned on when their respective gate-to-source voltages exceed their respective threshold voltages. The signal path FET Q1 is preferably biased with a fixed negative voltage $V_{g1}$ connected to its gate. Diversion control circuit 22 is implemented with an inverting amplifier 30 and a pass transistor Q3 which is preferably a PMOS FET. The input to circuit 22 ($i_{input}$) is connected to both the input of inverting amplifier 30 and to the source of pass transistor Q3. The output of inverting amplifier 30 is connected to both the gate of pass transistor Q3 and the gate of NMOS FET Q2.

In normal operation, $i_{input}$ flows into the source of Q3, and the output of amplifier 30 adjusts itself to provide whatever gate-source voltage Q3 needs to sustain $i_{input}$. If the photocurrent increases in magnitude, the output of amplifier 30 becomes more negative to provide the needed increase in Q3's gate-source drive; conversely, the amplifier's output becomes less negative if the photocurrent amplitude decreases. Pass transistor Q3 serves as an interface by presenting a low impedance to $i_{input}$ at its source terminal, and producing a high impedance output at its drain. Q3's function as an interface is aided by the connection of the inverting amplifier's output to Q3's gate: this increases the effective input impedance from the 1/gm provided by a common-gate MOSFET, to 1/(A+1)gm, where A is the open loop gain of the amplifier. Very little modulation of Q3 occurs when the amplitude of $i_{input}$ is kept within a fairly narrow range, and Q3 passes $i_{input}$ onto FETs Q1 and Q2 with little to no adverse affect. The gain of inverting amplifier 30 is arranged such that, under "normal" circumstances, i.e., with no induced pulses present in $i_{input}$, its output does not go so low as to turn on FET Q2, and most of the incoming signal is thus passed onto the signal path 14 as long as its amplitude is sufficient to turn on Q1.

When a positive-going pulse is induced into $i_{input}$, caused by the absorption of β or γ radiation, for example, the inverting amplifier's output swings in the negative direction. This change in the amplifier's output voltage is applied to the gate of Q2, which has two immediate effects: first, the negative voltage turns Q2 on, permitting photocurrent to flow in diversion path 16. The second effect is that the source voltage of Q2 follows its gate voltage, and thus becomes more negative. Q2's source is connected to Q1's source, and as such the negative-going voltage at Q2's source acts to turn off the PMOS Q1 and thus to block access to the signal path 14. When the induced pulse terminates, the output of amplifier 30 rises, and FETs Q2 and Q1 return to their normal operating states, i.e., Q1 on and Q2 off. Ideally, Q2 is turned on just long enough for the induced pulse to be completely diverted onto the diversion path 16.

The inverting amplifier 30 preferably provides some amplification to better enable the diversion of the small pulses typically induced in the signal path via ionizing radiation. The expected beta and gamma induced pulses commonly range from about $10^3$ to more than $10^6$ electronic charges ($q_e$). Amplification serves to both provide an output signal amplitude sufficient to turn on diversion path transistor Q2, as well as to slightly stretch out the duration of the very short induced pulse.

The advantageous use of amplifier 30 can also have an adverse affect on the performance of the diversion control circuit 22, by causing a phenomenon known as "toggling". The mechanism by which toggling occurs is now described: referring back to FIG. 2, the negative-going output from amplifier 30 is also applied to the gate of pass transistor Q3. In a typical application, input $i_{input}$ comes from a photodetector, which, because of its high impedance when back-biased, behaves as a current source. In combination with Q3, the photodetector and pass transistor tend to function as a source follower, so that the inverting amplifier's negative voltage swing is coupled to Q3's source and thereby to the inverting amplifier's input. After a time interval determined by the amplifier's frequency response characteristics, the amplifier's output swings in the positive direction and turns Q3 off.

Input $i_{input}$ continues to enter the pulse diversion circuit 12 while Q3 is off, charging the circuit's input capacitance (as well as the photodetector's junction capacitance), and the voltage at the input to amplifier 30 rises slowly. The amplifier output then begins to swing in the negative direction, turning Q3 back on and restoring the circuit's operating voltages to their pre-pulse states.

Figure 3:
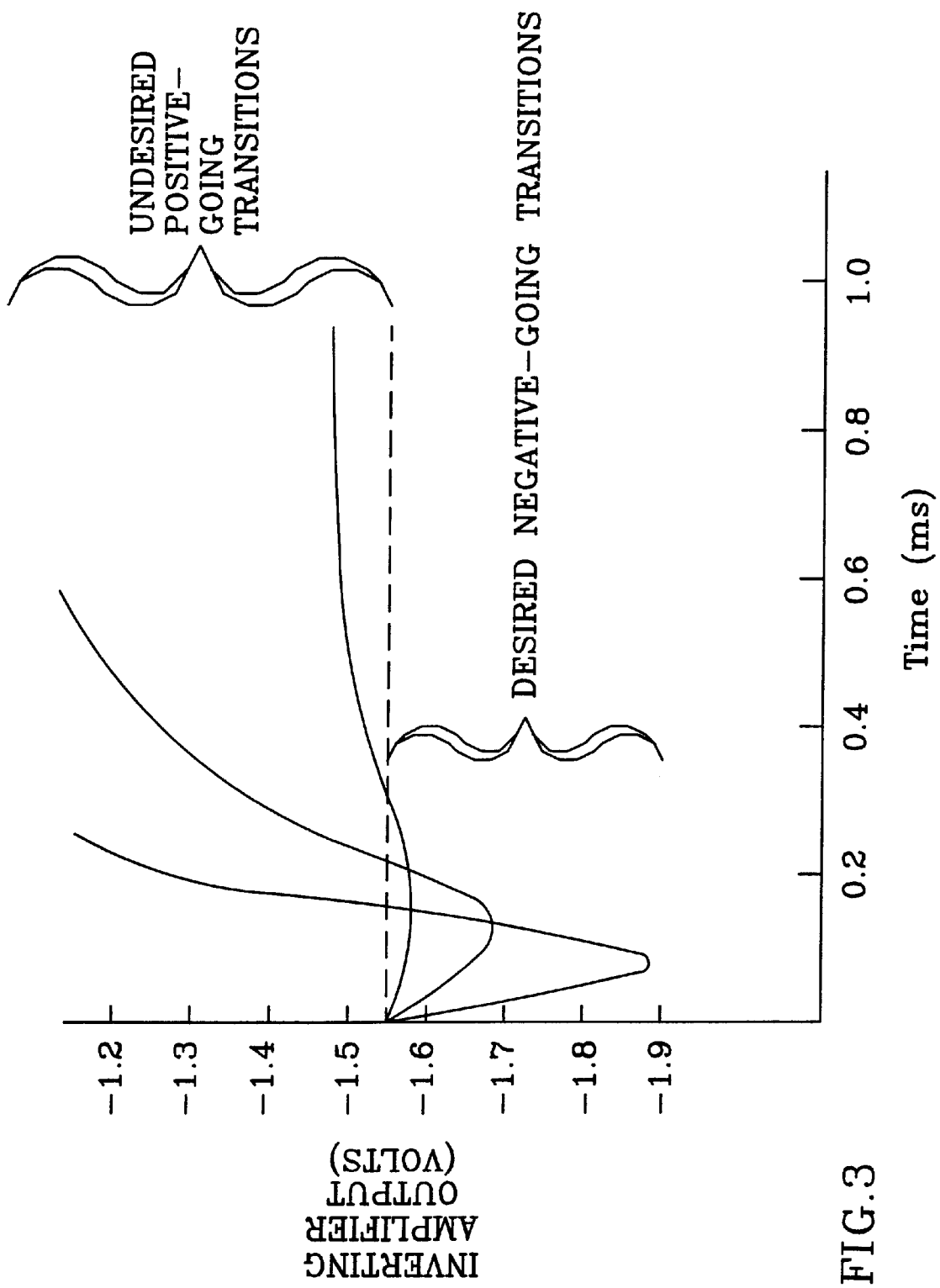
FIG. 3 is a graph illustrating a condition which can lead to undesirable "toggling".

The turning off of pass transistor Q3 is inherent in the operation of diversion control circuit 22, due to the coupling between Q3's gate and source. Though undesirable, it can be tolerated for a brief time interval because the photocurrent accumulates in the photodetector's junction capacitance and is not lost (assuming that the photodetector leakage current is negligible). The amplifier's recovery time, i.e., the time required for the amplifier to turn Q3 back on after reacting to a pulse event, can be kept short if, during the time Q3 is off, the amplifier remains in its active region. If the amplifier saturates, its gain effectively goes to zero, and the recovery time can become unacceptably long. When this occurs, significant amounts of photocurrent may never be integrated and entire frames of video data lost. This causes the image seen on a display to appear to toggle on and off, which is referred to as "toggling". A graph of amplifier output 40 relative to time is shown in FIG. 3, illustrating the undesired effects of unchecked toggling. Amplifier 30 is driven into saturation, with recovery taking 10–20 ms or longer— during which time incoming photocurrent does not get passed onto the signal path and integrated.

The pulse diversion circuit presented herein is arranged to reduce the occurrence of toggling, in addition to its duties diverting induced pulses from the signal path. An implementation of inverting amplifier 30 which makes both of these functions possible is shown in the schematic diagram of FIG. 4. Amplifier 30 is preferably made from a complementary pair of MOSFETs. A PMOS FET Q4 serves as a driver transistor, with its gate connected to receive the incoming $i_{input}$ signal and its source connected to a fixed positive voltage V+. Q4's drain is connected to the drain of a NMOS FET Q5 which serves as a load transistor, with its gate and source connected to a bias voltages $V_{loadg}$ and a fixed negative voltage V−, respectively. The junction formed by Q4's and Q5's respective drains serves as the output 40 of inverting amplifier 30.

Figure 5:
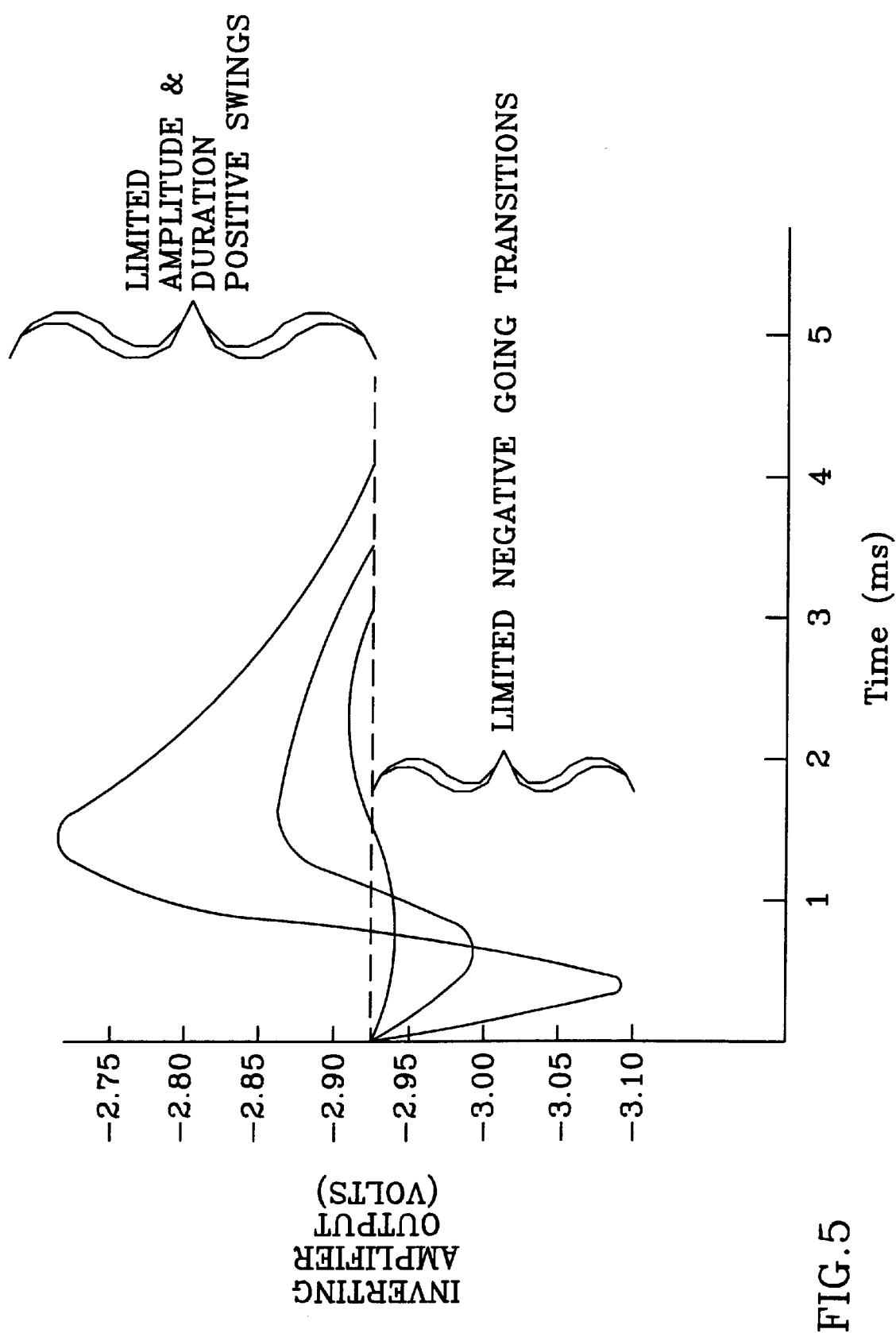
FIG. 5 is a graph illustrating how the invention limits the occurrence of toggling.

$V_{loadg}$ and V− set the amplifier's quiescent bias current. $V_{loadg}$ can also be used to control toggling by limiting the negative-going excursions of the amplifier's output. Because Q5 serves as Q4's load transistor, Q5's source voltage sets the level at which the amplifier's output 40 clips in the negative-going direction. Since toggling occurs when the amplifier's negative-going swing is coupled back to its input, adjustment of Q5's source voltage provides a means to mitigate toggling. When V− is adjusted properly, the amplifier's negative-going output swing clips for large pulses, keeping the amplifier from saturating when the output swings in the positive direction. Recovery can then take place rapidly, and the number of toggling occurrences reduced or eliminated. A graph of amplifier output 40 relative to time is shown in FIG. 5, illustrating the reduction in recovery time made possible by limiting the amplifier's negative-going output swing. V− is adjusted to reduce the negative-going excursion of the amplifier output 40 so that when the output swings positive due to coupling through Q3, the amplifier remains in its active region and recovers rapidly.

The proper operation of diversion path transistor Q2 must also be considered when setting voltage V−. Amplifier output 40 must be allowed to swing sufficiently negative to turn Q2 on. For one particular system, a good balance was obtained between toggling mitigation and pulse diversion when V− was adjusted such that pulses in the range of $150 \times 10^3 \cdot q_e$ to $300 \times 10^3 \cdot q_e$ were diverted with nearly 100% efficiency. Larger pulses are diverted with reduced efficiency, while for smaller pulses, the diversion path is kept open for too long and some of the photocurrent that should be retained is lost. For other systems, a compromise value for the amplifier's output excursion limit should be found, such that for some intermediate short pulse amplitude, the pulse diversion efficiency is nearly 100%.

Other factors must also be considered when setting bias voltages $V_{loadg}$ and V−. The unit cells in a focal plane array will include a pulse diversion circuit for each photodetector, and the power budget of the chip may dictate a fairly low quiescent current through amplifier 30. However, the amplifier's bias must be high enough to drive the capacitances present at the gates of both Q2 and Q3, so that the largest pulses can be satisfactorily diverted. As a practical matter, the limiting factor in reducing the amplifier's bias is the uniformity with which a large number of cells can be biased, determined by the sensitivity of the load transistors to threshold voltage variations. This sensitivity can be reduced by making Q5 long and narrow, but the extent to which this can be done is limited by the size of the unit cell. Since uniformity is so important, Q5 is preferably biased to operate in its strong inversion mode. Driver transistor Q4 typically has a high width-to-length ratio (W/L>1) and, with a relatively low bias current, ends up operating in weak or moderate inversion.

The value of the gate voltage $V_{g1}$ on signal path transistor Q1 also affects the diversion mechanism. Because $V_{g1}$ is coupled to Q1's source, which is connected in common with Q2's source, $V_{g1}$ affects the conductivity of both Q1 and Q2 for the photocurrent passed to them via Q3. In the absence of induced pulses, $V_{g1}$ sets the fraction of the photocurrent that flows into the diversion path. When induced pulses are present, $V_{g1}$ sets the pulse amplitude threshold for the diversion mechanism.

Figure 4:
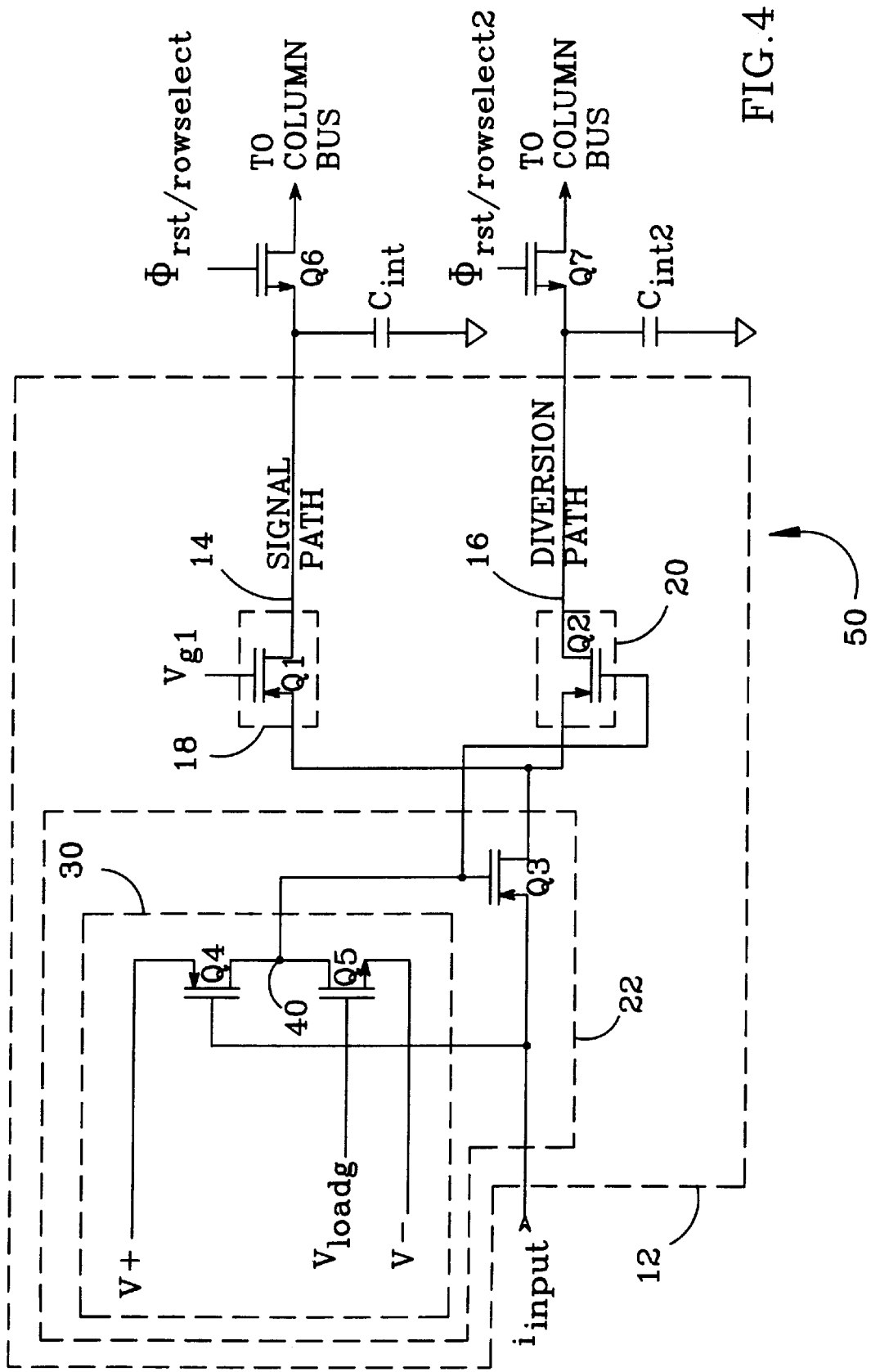
FIG. 4 is a schematic diagram of a preferred embodiment of the present invention.

For systems that must operate over a wide range of "background" values of photocurrent with relatively small values of superimposed video signal, $V_{g1}$ should be adjusted to the photocurrent background. If the scene being detected is characterized by a wide dynamic range of video signal photocurrent and a relatively low photocurrent background, the unit cells with high values of photocurrent lose an increased proportion of photocurrent to the diversion path. For high enough values of video signal photocurrent, the transfer function from the input to the signal path becomes nonlinear. Because of threshold voltage variations, this increase in signal loss and nonlinearity will be different from one unit cell to another. The result is a spatial nonuniformity in the image that is referred to as "fixed pattern noise". The use of a fixed value of $V_{g1}$ as shown in FIG. 4 is appropriate only if the nonlinearity and fixed pattern noise, which in principle are always present, are acceptably low.

If fixed pattern noise and nonlinearity were the only considerations, $V_{g1}$ would be set to shut off the diversion path completely. There is a competing consideration, however: when a gamma-induced pulse appears at the input of amplifier 30, the output voltage produced by the amplifier must be sufficient to temporarily turn on Q2 to deflect the gamma-induced pulse out of the signal path. The voltage drive required to do this is proportional to the pulse charge, and is small for small pulses. For a sufficiently small pulse, the amplifier cannot turn Q2 on from a completely shut off state, and the entire pulse goes into the signal path. In order to divert small pulses, $V_{g1}$ is adjusted so that Q2 is just barely turned on, with only a small fraction of the photocurrent flowing through it. If $V_{g1}$ is adjusted for a higher fraction of photocurrent through Q2, the fixed pattern noise and nonlinearity become excessive, and the temporal noise can also increase unacceptably. In practice, the fixed pattern noise (which appears as a nonuniformity in responsivity) and the temporal noise are the dominant factors. It has been determined that good performance is obtained when $V_{g1}$ is set so that not more than about 5% of the photocurrent continuously flows in the diversion path.

Figure 6:
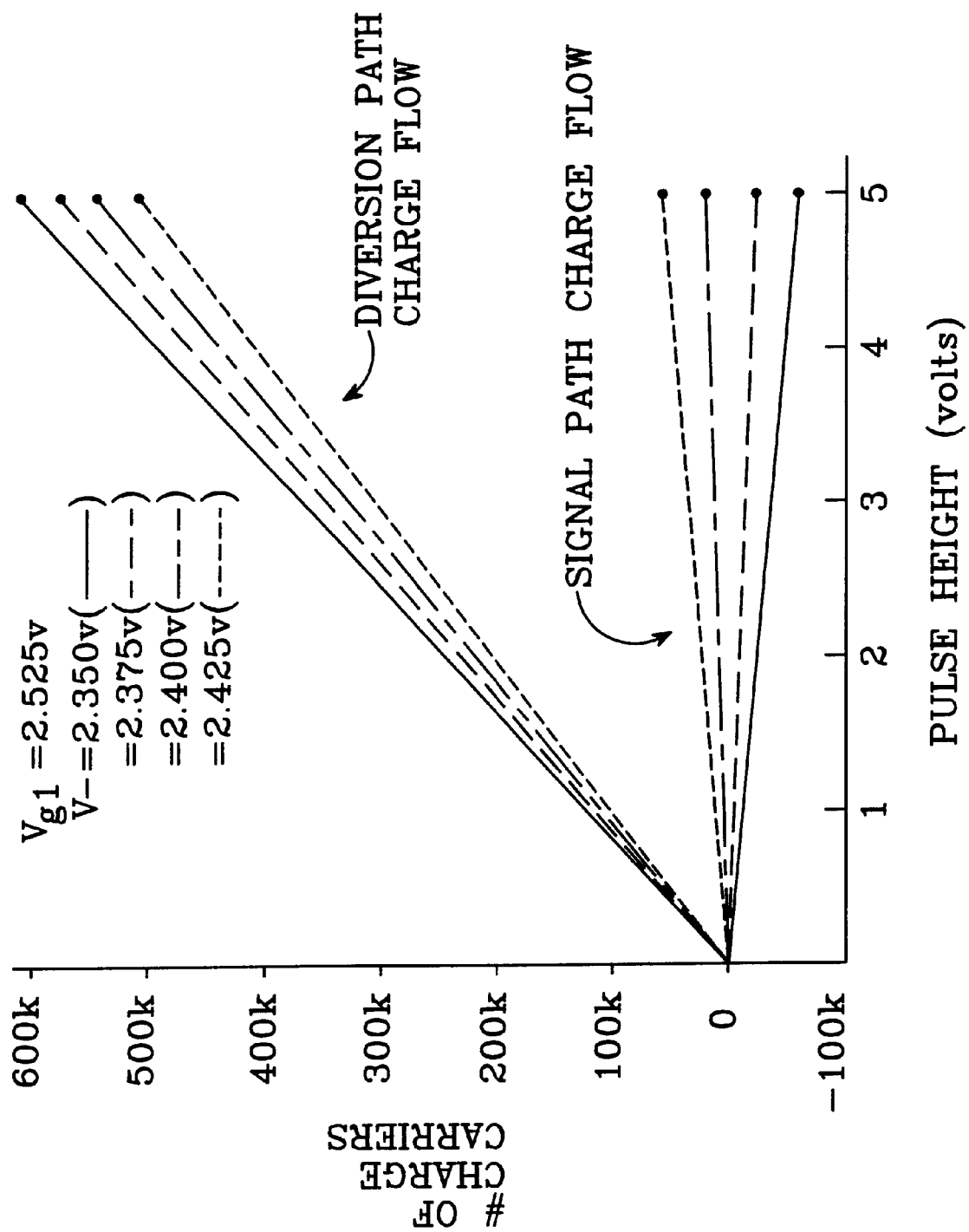
FIG. 6 is a graph illustrating the invention's pulse diversion performance for various bias voltages.

The interplay between Q1's bias voltage $V_{g1}$ and Q5's bias voltage V− is shown in FIG. 6, which plots number of charge carriers carried on the signal and diversion paths versus pulse height for four combinations of bias voltages. Diversion of 90% or more of an induced pulse's charge carriers has been demonstrated. As noted above, the value of V− is adjusted to control toggling. Since the current through Q5 depends on the difference between $V_{loadg}$ and V−, $V_{loadg}$ need also be adjusted when V− is adjusted.

Referring back to FIG. 4, a unit cell 50 is formed when an integrating capacitor $C_{int}$ and a switching transistor Q6 are connected to receive the photocurrent directed onto signal path 14 of pulse diversion circuit 12. The operation of transistor Q6 is controlled by a timing signal $\phi_{rst/rowselect}$ connected to its gate, and its drain is connected to a column bus (not shown). $\phi_{rst/rowselect}$ is pulsed at the end of an integration period to transfer the charge stored on integrating capacitor $C_{int}$ to the column bus. A similar circuit can be connected to diversion path 16, comprised of an integrating capacitor $C_{int2}$ and a switching transistor Q7 controlled by a timing signal $\phi_{rst/rowselect2}$, if it is desired to store and readout the diverted current.

A number of alternative implementations of inverting amplifier 30 are possible—it is only necessary that the inverting amplifier provide some gain to amplify the very small induced pulses, and that it offer a mechanism to mitigate the adverse affects of toggling. The two-FET inverting amplifier implementation shown in FIG. 4 is preferred for two reasons: 1) a unit cell that includes this amplifier is compact enough to fit within the area typically allotted to an integrated unit cell; and 2) the unit cell can be fabricated with a standard CMOS fabrication process.

Figure 7:
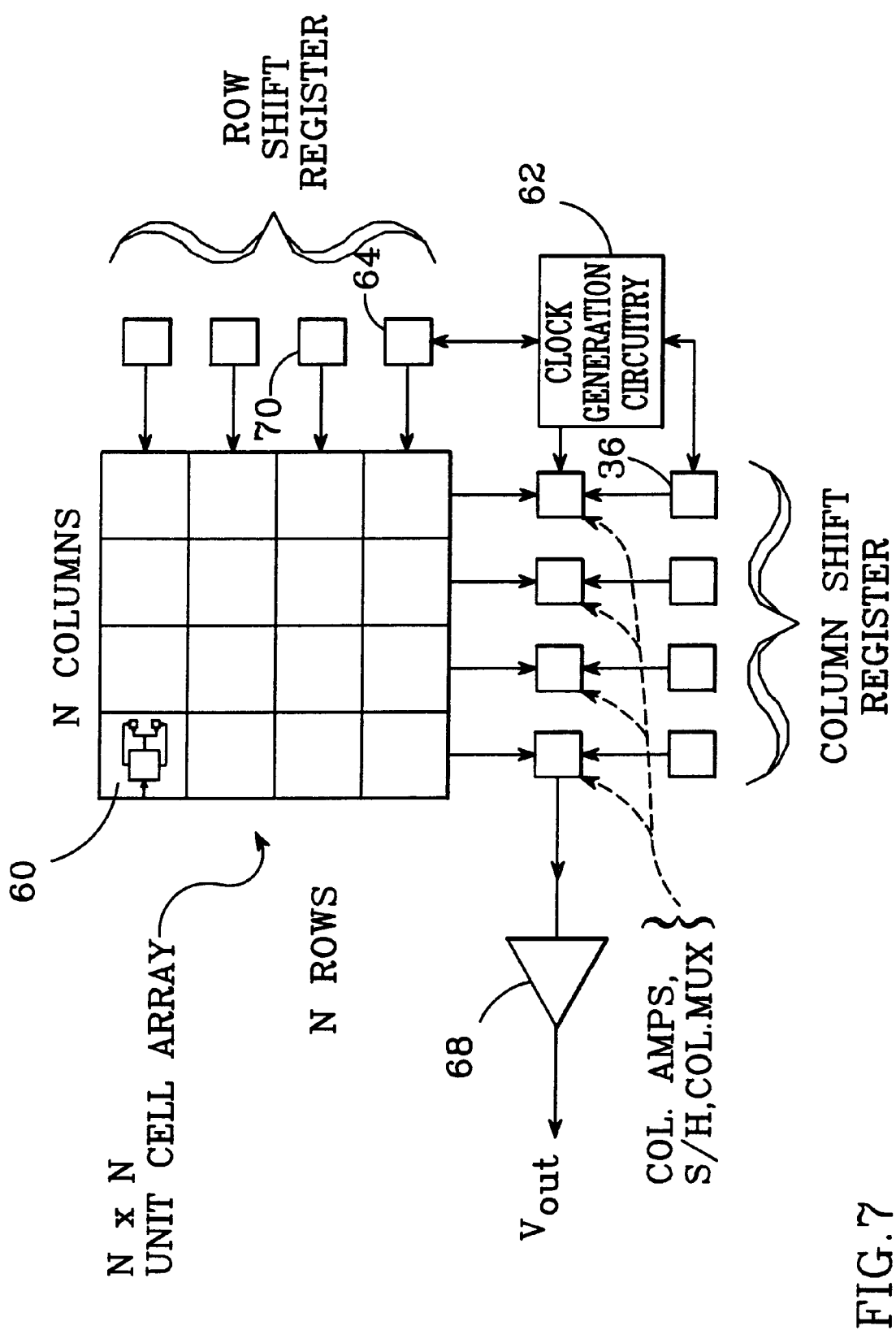
FIG. 7 is a block diagram of an N×N array of unit cells which each include a pulse diversion circuit per the present invention.

A number of unit cells per the present invention can be assembled into an N×N array to form an imaging chip; the typical architecture of such a chip is shown in FIG. 7. Each unit cell 60 in the array is as described above; i.e., with a diversion control circuit arranged to divert induced pulses from a signal path to a diversion path. The configuration shown forms a "staring" array in which image data is read out one row at a time, with the outputs of the N unit cells in a row being multiplexed out to a linear array of N column amplifiers and sample and hold circuits.

In operation, three sequential timing periods are required for each video frame: the unit cell reset time, the photocurrent integration time, and the data readout time. The unit cell reset time occurs at the beginning of the video frame, during which the integrating capacitors in all N×N unit cells are set to a voltage $V_{reset}$. A photocurrent integration period is then started. If the photocurrent flow has not been interrupted, disconnecting the integrating capacitor from $V_{reset}$ starts the integration period. Additionally, the photocurrent flow can be controlled by setting the gate voltage $V_{g1}$ on signal path transistor Q1 to permit photocurrent to pass through to the capacitor. Manipulation of $V_{g1}$ is also commonly used to terminate the integration period.

Data readout is performed immediately following the integration period. Clock generation circuitry 62 inserts a logic "one" into the first stage 64 of a row shift register, and another "one" is inserted into the first stage 66 of a column shift register. This "one" causes the signals stored on the integrating capacitors of the first row of unit cells to be transferred simultaneously to an array of N column amplifiers/sample and hold circuits/multiplexers. The clock generation circuitry 62 then shifts the "one" down the N stages of the column shift register, causing the signal voltages on the sample and hold circuits to be sequentially read into an output driver 68.

After data in the first row of unit cells has been read out, the clock generation circuitry 62 shifts the "one" in the row shift register to the second stage 70, and the row data readout sequence is repeated for the second row. This sequence of events continues until the Nth row is read out.

Only MOSFETs have been specifically discussed to implement the invention's inverting amplifier and gate devices. The invention is not limited to these implementations, however. Other types of transistors, including JFETs, MESFETs, and bipolar transistors could also be employed to perform these functions. However, focal plane arrays are typically operated at very low temperatures at which bipolar transistors perform poorly.

In FIG. 4, the source of Q5 and the drain of Q2 are both shown connected to fixed negative voltage V−. The invention does not require that these two terminal voltages be the same: V− is connected to both terminals simply out of convenience.

While particular embodiments of the invention have been shown and described, numerous variations and alternate embodiments will occur to those skilled in the art. Accordingly, it is intended that the invention be limited only in terms of the appended claims.

We claim:

1. A pulse diversion circuit, comprising:
   a first gate device which controls access to a signal path,
   a second gate device which controls access to a diversion path, and
   a diversion control circuit connected to feed an incoming data stream to said first and second gate devices, said diversion control circuit arranged to sense the occurrence of an induced pulse in said incoming data stream and in response to said pulse cause said second gate device to increase access to said diversion path to divert said incoming data stream to said diversion path.

2. The pulse diversion circuit of claim 1, wherein said diversion control circuit comprises an inverting amplifier and a pass device having a control input, said inverting amplifier connected to receive said incoming data stream at an input and to said control input at an output, said pass device arranged to pass said incoming data stream to said first and second gate devices in accordance with said inverting amplifier output.

3. The pulse diversion circuit of claim 2, wherein said inverting amplifier output is connected to said second gate device and arranged to cause said second gate device to increase access to said diversion path in response to the receipt of an induced pulse in said incoming data stream, to divert said pulse to said diversion path.

4. The pulse diversion circuit of claim 3, wherein said second gate device is a p-type transistor and said inverting amplifier is arranged to produce a negative-going output in response to the receipt of a positive-going induced pulse in said incoming data stream, said negative-going output increasing the conductivity of said second gate device and thereby increasing access to said diversion path.

5. The pulse diversion circuit of claim 4, wherein said first and second gate devices are arranged such that the conductivity of said first gate device is reduced when the conductivity of said second gate device is increased by said negative-going output, thereby reducing access to said signal path.

6. The pulse diversion circuit of claim 3, wherein said second gate device is an n-type transistor and said inverting amplifier is arranged to produce a positive-going output in response to the receipt of a negative-going induced pulse in said incoming data stream, said positive-going output increasing the conductivity of said second gate device and thereby increasing access to said diversion path.

7. The pulse diversion circuit of claim 6, wherein said first and second gate devices are arranged such that the conductivity of said first gate device is reduced when the conductivity of said second gate device is increased by said positive-going output, thereby reducing access to said signal path.

8. The pulse diversion circuit of claim 1, wherein said first and second gate devices and said diversion control circuit are integrated together on a common substrate.

9. An induced pulse diversion circuit suitable for use with a focal plane readout unit cell, comprising:
- a signal path having a gate device which controls access to said signal path in accordance with a signal applied at a control input,
- a diversion path having a gate device which controls access to said diversion path in accordance with a signal applied at a control input, and
- a diversion control circuit which receives a photocurrent at an input and is arranged to divert pulses induced in said photocurrent to said diversion path, comprising:
  - an inverting amplifier having an input connected to receive said photocurrent and an output, and
  - a pass device having a control input connected to receive the output of said inverting amplifier and arranged to pass said photocurrent to both of said gate devices in accordance with said inverting amplifier output,
- said inverting amplifier output connected to the control input of said diversion path gate device and arranged to open said gate device upon receipt of an induced pulse in said photocurrent to divert said pulse to said diversion path.

10. The pulse diversion circuit of claim 9, wherein said first and second gate devices are arranged such that said first gate device is closed when said inverting amplifier output causes said second gate device to be opened.

11. The pulse diversion circuit of claim 9, wherein said inverting amplifier is arranged to limit the negative-going excursions of its output made in response to the receipt of a positive-going induced pulse to reduce the amount of time said pass device is turned off by said amplifier's consequent positive-going output.

12. The pulse diversion circuit of claim 9, wherein said inverting amplifier is arranged to limit the positive-going excursions of its output made in response to the receipt of a negative-going induced pulse to reduce the amount of time said pass device is turned off by said amplifier's consequent negative-going output.

13. The pulse diversion circuit of claim 9, wherein said inverting amplifier comprises a pair of complementary transistors connected to a pass device.

14. The pulse diversion circuit of claim 13, wherein said complementary pair of transistors includes a driver transistor which receives said photocurrent at its control input and is connected to a load transistor biased to set the quiescent bias current through the inverting amplifier, the output of said inverting amplifier taken at the junction of said driver and load transistors.

15. The pulse diversion circuit of claim 14, wherein said load transistor is biased to limit the negative-going excursions of said inverting amplifier output made in response to the receipt of a positive-going induced pulse to prevent said inverting amplifier from saturating and thereby to reduce the toggling of said pass device on and off.

16. The pulse diversion circuit of claim 14, wherein said load transistor is biased to limit the positive-going excursions of said inverting amplifier output made in response to the receipt of a negative-going induced pulse to prevent said inverting amplifier from saturating and thereby to reduce the toggling of said pass device on and off.

17. The pulse diversion circuit of claim 16, wherein said load transistor is biased to limit the negative-going excursions of said inverting amplifier output such that nearly all induced pulses in the range of 150,000 to 300,000 electronic charges ($q_e$) are diverted to said diversion path.

18. The pulse diversion circuit of claim 14, wherein said driver transistor is a PMOS field-effect transistor (FET) and said load transistor is a NMOS FET, said inverting amplifier output taken at the junction of their respective drains.

19. The pulse diversion circuit of claim 14, wherein said driver transistor is an NMOS field-effect transistor (FET) and said load transistor is a PMOS FET, said inverting amplifier output taken at the junction of their respective drains.

20. The pulse diversion circuit of claim 9, wherein said first and second gate devices are PMOS field-effect transistors and said inverting amplifier is arranged to produce a negative-going output in response to the receipt of a positive-going induced pulse in said photocurrent, said negative-going output increasing the conductivity of said second gate device and thereby increasing access to said diversion path to divert said positive-going induced pulse to said diversion path.

21. The pulse diversion circuit of claim 9, wherein said first and second gate devices are NMOS field-effect transistors and said inverting amplifier is arranged to produce a positive-going output in response to the receipt of a negative-going induced pulse in said photocurrent, said positive-going output increasing the conductivity of said second gate device and thereby increasing access to said diversion path to divert said negative-going induced pulse to said diversion path.

22. The pulse diversion circuit of claim 21, wherein the gate of said first gate device is connected to a bias voltage, said biasing establishing the fraction of said photocurrent diverted to said diversion path in the absence of induced pulses.

23. The pulse diversion circuit of claim 22, wherein said biasing of said first gate device is arranged such that no more than 5% of said photocurrent is diverted to said diversion path in the absence of induced pulses.

24. The pulse diversion circuit of claim 9, further comprising a photodetector which produces said photocurrent at an output.

25. The pulse diversion circuit of claim 24, wherein said diversion control circuit is arranged to divert pulses induced in said photocurrent as a result of said photodetector's absorption of ionizing radiation.

26. The pulse diversion circuit of claim 9, wherein said signal path, said signal path's gate device, said diversion path, said diversion path's gate device, and said diversion control circuit are integrated together on a common substrate.

27. A focal plane readout unit cell, comprising:
a pulse diversion circuit, comprising:
a signal path having a gate device which controls access to said signal path in accordance with a signal applied at a control input,
a diversion path having a gate device which controls access to said diversion path in accordance with a signal applied at a control input, and
a diversion circuit which receives a photocurrent at an input and is arranged to divert pulses induced in said photocurrent to said diversion path, comprising:
an inverting amplifier having an input connected to receive said photocurrent and an output, and
a pass device having a control input connected to receive the output of said inverting amplifier and arranged to pass said photocurrent to both of said gate devices in accordance with said inverting amplifier output,
said inverting amplifier output connected to the control input of said diversion path gate device and arranged to open said gate device upon receipt of an induced pulse in said photocurrent to divert said pulse to said diversion path;
an integrating capacitor connected to said signal path and arranged to integrate photocurrent received by said capacitor via said signal path during an integration period, and
a switching device connected to said integrating capacitor and arranged to read out the charge stored on said integrating capacitor at the end of said integration period.

28. The unit cell of claim 27, further comprising a second integrating capacitor and a second switching device connected to said diversion path, said second integrating capacitor arranged to integrate current received by said second capacitor via said diversion path and said second switching device connected to said second integrating capacitor and arranged to read out the charge stored on said second integrating capacitor.

29. The unit cell of claim 27, wherein said pulse diversion circuit, said integrating capacitor and said switching device are integrated together on a common substrate.

30. An integrated focal plane array with induced pulse diversion circuitry, comprising:
a plurality of focal plane readout unit cells arranged into a row and column array, each unit cell comprising:
a pulse diversion circuit, comprising:
a signal path having a gate device which controls access to said signal path in accordance with a signal applied at a control input,
a diversion path having a gate device which controls access to said diversion path in accordance with a signal applied at a control input, and
a diversion circuit which receives a photocurrent at an input and is arranged to divert pulses induced in said photocurrent to said diversion path, comprising:
an inverting amplifier having an input connected to receive said photocurrent and an output, and
a pass device having a control input connected to receive the output of said inverting amplifier and arranged to pass said photocurrent to both of said gate devices in accordance with said inverting amplifier output,
said inverting amplifier output connected to the control input of said diversion path gate device and arranged to open said gate device upon receipt of an induced pulse in said photocurrent to divert said pulse to said diversion path;
an integrating capacitor connected to said signal path and arranged to integrate photocurrent received by said capacitor via said signal path during an integration period, and
a switching device connected to receive a timing pulse at a control input and to said integrating capacitor and arranged to read out the charge stored on said integrating capacitor at the end of said integration period in response to said timing pulse;
clock generation circuitry arranged to generate said timing pulses to each of said switching devices in said array, and
a plurality of column multiplexers connected to respective columns of said unit cells for assembling the charges from said array of unit cells into a video frame, said unit cells, clock generation circuitry and column multiplexers integrated together on a common substrate.

31. The focal plane array of claim 30, further comprising a second integrating capacitor and a second switching device connected to said diversion path, said second integrating capacitor arranged to integrate current received by said second capacitor via said diversion path and said second switching device connected to receive a timing pulse at a control input and arranged to read out the charge stored on said second integrating capacitor in response to said timing pulse.

32. The focal plane array of claim 30, further comprising a plurality of photodetectors connected to respective focal plane readout unit cells and supplying said photocurrents to said photodetector interface circuits.

33. A method of diverting pulses induced in an input signal, comprising the steps of:
feeding an input signal to a signal path and a diversion path,
amplifying said input signal, and
increasing said input signal's access to said diversion path when said amplified input signal exceeds a threshold indicative of the presence of an induced pulse, said increased access diverting most of said input signal from said signal path to said diversion path.

34. The method of claim 33, further comprising the step of reducing said input signal's access to said signal path when said amplified input signal exceeds a threshold indicative of the presence of an induced pulse.

35. The method of claim 33, wherein said step of increasing said input signal's access to said diversion path is accomplished with a gate device having a control input connected to receive said amplified input signal, the conductivity of said gate device and thereby the access to said diversion path varying in accordance with said amplified input signal.

36. The method of claim 35, wherein said step of amplifying said input signal further comprises the step of inverting said input signal, the conductivity of said gate device increasing as the output of said amplifier changes in response to an induced pulse.

37. The method of claim 36, further comprising the steps of coupling said amplifier's output to its input and limiting the excursions of said amplifier's output to prevent said amplifier from saturating in response to an induced pulse.

* * * * *